(12) United States Patent
Desai et al.

(10) Patent No.: US 9,026,589 B1
(45) Date of Patent: May 5, 2015

(54) STUBBING TECHNIQUES IN DISTRIBUTED-SERVICES ENVIRONMENTS

(75) Inventors: Nirav P. Desai, Issaquah, WA (US); Stanislava R. Vlasseva, Seattle, WA (US); Gurbinder S. Gill, Seattle, WA (US); Kyle Andrew Farrell, Seattle, WA (US); Michael C. Moore, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 656 days.

(21) Appl. No.: 12/851,176

(22) Filed: Aug. 5, 2010

Related U.S. Application Data

(60) Provisional application No. 61/331,132, filed on May 4, 2010.

(51) Int. Cl.
*G06F 15/16* (2006.01)
*G06F 17/30* (2006.01)

(52) U.S. Cl.
CPC .............................. *G06F 17/30023* (2013.01)

(58) Field of Classification Search
USPC .................................. 709/203–205, 217–229
See application file for complete search history.

(56) References Cited

U.S. PATENT DOCUMENTS

| | | | | |
|---|---|---|---|---|
| 7,610,386 | B1 * | 10/2009 | Martinez et al. ............... | 709/227 |
| 7,720,954 | B2 * | 5/2010 | Raja et al. ...................... | 709/223 |
| 7,853,699 | B2 * | 12/2010 | Wu et al. ........................ | 709/227 |
| 2003/0135411 | A1 * | 7/2003 | Ushiki et al. .................... | 705/14 |
| 2005/0165914 | A1 * | 7/2005 | Moore et al. ................... | 709/219 |
| 2006/0129537 | A1 * | 6/2006 | Torii et al. ......................... | 707/3 |
| 2007/0294668 | A1 * | 12/2007 | Mohindra et al. ............. | 717/120 |
| 2008/0109448 | A1 * | 5/2008 | Aboel-Nil et al. .............. | 707/10 |
| 2011/0093925 | A1 * | 4/2011 | Krishnamoorthy et al. ...... | 726/4 |
| 2011/0161663 | A1 * | 6/2011 | Nakhjiri ......................... | 713/158 |
| 2011/0246429 | A1 * | 10/2011 | Prahlad et al. ................ | 707/679 |
| 2012/0151250 | A1 * | 6/2012 | Saika ............................ | 714/4.11 |

\* cited by examiner

*Primary Examiner* — Yasin Barqadle
(74) *Attorney, Agent, or Firm* — Lee & Hayes, PLLC

(57) ABSTRACT

A stubbing service records requests and corresponding replies for purpose of playing back the recorded replies in response to re-receiving the corresponding requests. In a record mode, the stubbing service may receive a request from a first service intended for a second service. The stubbing service may send the request onto the second service and may, in response, receive a reply to the request from the second service. The stubbing service may then pass the reply onto the first service. When in a playback mode, the stubbing service may directly serve the stored reply to the first service in response to receiving the same request intended for the second service from the first service.

24 Claims, 6 Drawing Sheets

PASS THROUGH MODE EXAMPLE
400

RECORD MODE EXAMPLE
200

PLAYBACK MODE EXAMPLE
300

VERIFICATION MODE EXAMPLE
600

STUBBING TECHNIQUES IN DISTRIBUTED-SERVICES ENVIRONMENTS

PRIORITY

The present application claims priority to U.S. Provisional Application Ser. No. 61/331,132, filed on May 4, 2010, entitled "Stubbing Techniques in Distributed-Services Environments." This application is herein incorporated by reference in its entirety, and the benefit of the filing date of this application is claimed to the fullest extent permitted.

BACKGROUND

In a distributed-services environment, different operators may operate and control each of the multiple different services within the environment to perform a particular task. These services, however, may rely upon one another to achieve these tasks. For instance, a first service may make calls to second service and a third service (and potentially many more) within the environment when executing the task of the first service. As such, the first service is dependent upon the second and third services while still generally operating and controlling the task of the first service independently.

These dependencies create difficulties in creating a consistent testing environment for the distributed services. In the above example, the first service may make calls into the second and third services when the first service is under test. However, in order to effectively test the first service to determine how different changes affect the first service, the first service may need to receive consistent replies from the second and third services when making consistent calls or requests to these services. That is, the first service may desire to receive a same reply from the second service in response to sending a same request to the second service, and the first service may desire the same behavior from the third service.

However, because the second and third services may themselves change over time, the replies sent to the first service may vary and, hence, cannot be relied upon to provide a stable output. As such, the first service may actually need to contact the different entities controlling the second and third services in order to ask these entities to "stage" a consistent reply. That is, the first service may need to inform the controlling entities that the first service is under test and, hence, that the first service would like to receive a consistent reply to a same request for a certain amount of time.

Unfortunately, this scenario presents several disadvantages. First, the entity controlling the first service must contact the entities controlling the second and third services, which themselves must spend time staging the replies. This overhead proves costly in terms of time and resources. Second, if the first service chooses to run a same test after a certain amount of time (e.g., one week after running an initial test), the first service might not receive the needed consistent reply. That is, the second or third service may no longer provide the consistent reply and, as such, the first service becomes unable to replicate the testing conditions needed for a consistent testing environment.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
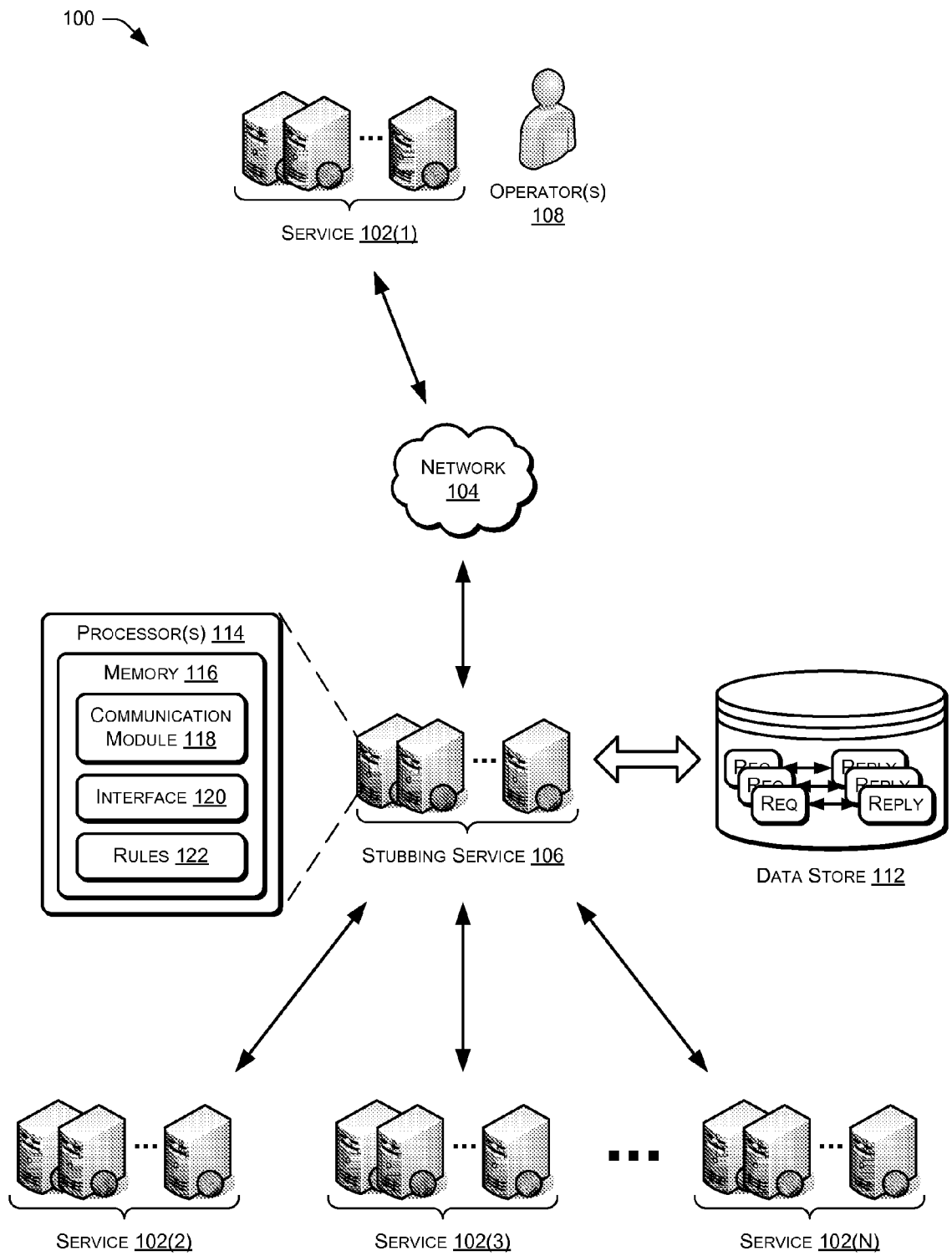
FIG. 1 illustrates a distributed-services environment that includes a stubbing service configured to receive a request from a first service destined for a second service, receive and store a reply to the request from the second service, and pass the reply back to the first service. Thereafter, the stubbing service may provide the stored reply to the first service in response to receiving the same request, in lieu of passing the request onto the second service.

This disclosure describes an architecture and techniques for implementing a stubbing service that is configured to record requests and corresponding replies and to later play back the recorded replies in response to again receiving the corresponding requests. As discussed above, services within a distributed-services environment may operate to achieve discrete tasks while still relying upon other services within the environment. For instance, a first entity may operate and control the first service described above, while second and third entities may operate and control the second and third services, respectively.

The stubbing service, meanwhile, may reside "between" each of these (and other) services in the environment. To continue the example from above, when the first service sends a request to the second service, the stubbing service may initially receive this request and pass this request through to the second service. The second service may then provide a corresponding reply to the request to the stubbing service. In response, the stubbing service may store the reply in association with the request in a data store accessible to the stubbing service. Thereafter, when the first service sends the same request to the stubbing service, the stubbing service may retrieve the stored reply from the second service and may provide this stored reply or a reply based on the stored reply to the first service. As such, the stubbing service need not pass the request back to the second service in response to again receiving the request from the first service.

By doing so, the first service may rely upon receiving a consistent reply in response to sending a same request. That is, in opposition to the challenges described above, the first service may configure the stubbing service to send a "recorded" reply back to the first service when the first service sends a particular request. As such, the first service can rely upon this consistency, allowing the first service to maintain a consistent environment. This consistent environment allows the first service to, for example, run tests without the need to consistently contact operators of the second or third services (and/or other services within the environment).

The stubbing service may operate in a multitude of different modes, the particular mode of which individual services may control. In a "record mode," the stubbing service may receive a request and pass this request to the intended recipient. The stubbing service may then receive a reply, store the reply for later use, and pass the reply back to the requesting service, as discussed above.

The stubbing service may also operate in a "playback mode." Here, the stubbing service receives a request and, in response, identifies a reply previously stored in association with the received request. After identifying the reply, the stubbing service may thereafter pass the reply back to the requesting service, possibly without contacting the service to which the request was addressed.

In still other instances, the stubbing service may operate in an "auto mode," where the stubbing service combines techniques of both the record and playback modes. When in the auto mode, the stubbing service queries a data store to determine whether or not the data store stores a reply in association with a received request. If so, the stubbing service obtains the stored reply from the data store and passes the stored reply back to the service that sent the request. If not, the stubbing service passes the request along to the service to which the request is addressed. After doing so, the stubbing service may store the received reply in association with the request in the data store for future use, before or after providing the reply back to the requesting service.

In a "pass through mode," the stubbing service acts as a proxy and simply passes received requests and replies onto the intended services without storing or otherwise accessing the data store. In a "verification mode," meanwhile, the stubbing service determines whether a reply stored in the data store is up to date. To do so, the stubbing service may send a query (periodically or randomly) to the particular service that originally provided the reply. If the service sends a reply that is the same as the stored reply, then the stubbing service may maintain the data record associated with the stored reply. If the service sends a different reply, then the stubbing service may update the data store, while potentially maintaining the old version of the reply.

Furthermore, the stubbing service may operate in different modes for different services of a distributed-service environment, possibly at the same time. For instance, the stubbing service may operate in a record mode for a first service during a certain timeframe, while also operating in a playback mode for a second, different service during that timeframe.

FIG. 1 illustrates an example distributed-services environment 100 that may implement the described techniques. The environment 100 may include a plurality of different services 102(1), 102(2), 102(3), . . . , 102(N) that communicate with one another over a network 104. These services may be dependent upon one another, while being separately controlled. Even when separately controlled, these services may or may not each be associated with a common entity or owner. The network 104 is representative of any one or combination of multiple different types of networks, such as the Internet, cable networks, cellular networks, wireless networks, and wired networks. The network 104 may be a public or a private network. Furthermore, while FIG. 1 illustrates several arrows, each of the illustrated services may communicate directly or indirectly with one another via the network 104.

Each of the services 102(1)-(N) may operate to perform a particular task for a common or different entities. For instance, each service may perform one or more discrete tasks for a common company, such as an e-commerce retailer, an educational institution, a governmental agency, or any other entity that operates different services to perform different tasks.

In the example of the e-commerce retailer, for instance, a first service may implement and maintain a catalog of items offered for acquisition, a second service may implement customer ordering, a third service may implement customer payments, a fourth service may implement and maintain user accounts and so on. In this and other examples, the discrete services are operated and controlled separately, but rely upon one another for various inputs. For instance, a customer ordering service may place and control orders on behalf of customers. To do so, however, the customer ordering service may send requests to and receive replies from the catalog service, the payments service, the user account service, and the like. For instance, the catalog service may provide information about the item that a customer wishes to purchase, the payments service may maintain information regarding payment instruments associated with the customer, the user account service may maintain shipping preferences for the customer, and the like.

In this example, the environment 100 further includes a stubbing service 106. As described above, the stubbing service 106 is configured to operate in a variety of different modes, such as record mode, playback mode, auto mode, pass through mode, and verification mode. Furthermore, requests sent within the distributed-services environment 100 are configured to route through the stubbing service 106 rather than directly to the service to which the request is intended or addressed.

As illustrated, each of the services 102(1)-(N) and the stubbing service 106 is embodied as one or more servers that collectively have processing and storage capabilities to receive and send requests. These servers may be embodied in any number of ways, including as a single server, a cluster of servers, a server farm or data center, and so forth, although other server architectures (e.g., mainframe) may also be used. Alternatively, some or all of the services 102(1)-(N) and the stubbing service 106 may be embodied as a client device, such as desktop computer, a laptop computer, and so forth.

FIG. 1 illustrates that one or more operators 108 may operate and/or control the service 102(1). The same or different operators may likewise operate and/or control each of the services 102(2)-(N). In some instances, the operator 108 may places service 102(1) under test (as may other operators of other services). In some examples, the operator 108 may do so with use of a test framework, which may entail sending different requests and receiving respective replies from one or multiple ones of the services 102(2)-(N). The stubbing service 106 may receive some or each of these requests, as described in detail below.

The stubbing service 106, meanwhile, includes or otherwise has access to a data store 112. The data store 112 stores replies in association with corresponding requests. For instance, when the service 102(1) makes a particular and unique request to the service 102(2), the stubbing service 106 may store the reply from the service 102(2) in association with the particular and unique request in the data store. By doing so, the stubbing service 106 may later access the reply after receiving that particular request (from the service 102(1) or, in some instances, from another service). In addition or in the alternative, the data store 112 may store batches of requests and corresponding replies. In some instances, the data store 112 stores a batch as a group of linked and potentially time-ordered requests and replies, possibly associated with varying services of the distributed-services environment.

The stubbing service 106 comprises one or more processors 114 and memory 116, which stores a communication module 118, an interface 120, and one or more rules 122. The communication module 118 functions to receive communications from and to communicate with respective ones of the services 102(1)-(N). For instance, the communication module 118 may receive requests from the distributed services and may pass these requests along to the corresponding intended services.

The interface 120, meanwhile, allows the services 102(1)-(N) to access and configure the stubbing service 106. In some instances, the services 102(1)-(N) download or otherwise obtain an application for storage on a local machine of the service for configuring the stubbing service 106. In other instances, meanwhile, the services access and directly configure the stubbing service 106 over the network 104.

In some instances, the services 102(1)-(N) may configure the stubbing service 106 to operate in a certain mode. For instance, when running the test with use of a test framework, the operator of the service 102(1) may configure the stubbing service 106 to operate in the auto mode, discussed along with other modes in detail below.

In addition or in the alternative, the operator 108 may access the stubbing service to populate the data store 112 with pre-configured replies. For instance, the operator may store a particular reply in association with a particular request, thereby allowing the operator 108 to rely upon that reply as a stable output (or programmatic response) to the particular request.

In some instances, these programmatic responses allow a first service, such as the service 102(1), to determine how a future development of a second service, such as the service 102(2), will affect operation of the first service. For instance, if the operator 108 of the service 102(1) knows that the service 102(1) will soon launch a particular new feature, the service 102(1) can predict what changes if any the new feature will make to a reply received from the service 102(2) in response to the service 102(1) sending a request. Then, the service 102(1) may program the stubbing service 106 to send such a reply in response to a particular request made by the service 102(1), thus allowing the service 102(1) to see how this reply (and, hence, the new feature) will affect the overall operation of the service 102(1) prior to the actual launch of the feature.

In addition or in the alternative, the operator 108 may configure the stubbing service 106 with one or more rules 122. The service 102(1) or the stubbing service 106 may store these rules, which generally provide instructions for the stubbing service given a particular set of conditions. To provide one of multiple possible examples, the operator 108 may provide a rule that instructs the stubbing service to access the data store 112 to obtain and provide a stored reply in response to receiving a first type of request, while instructing the data store 112 to pass a received request along to the intended service in response to receiving a second type of request.

Figure 2:
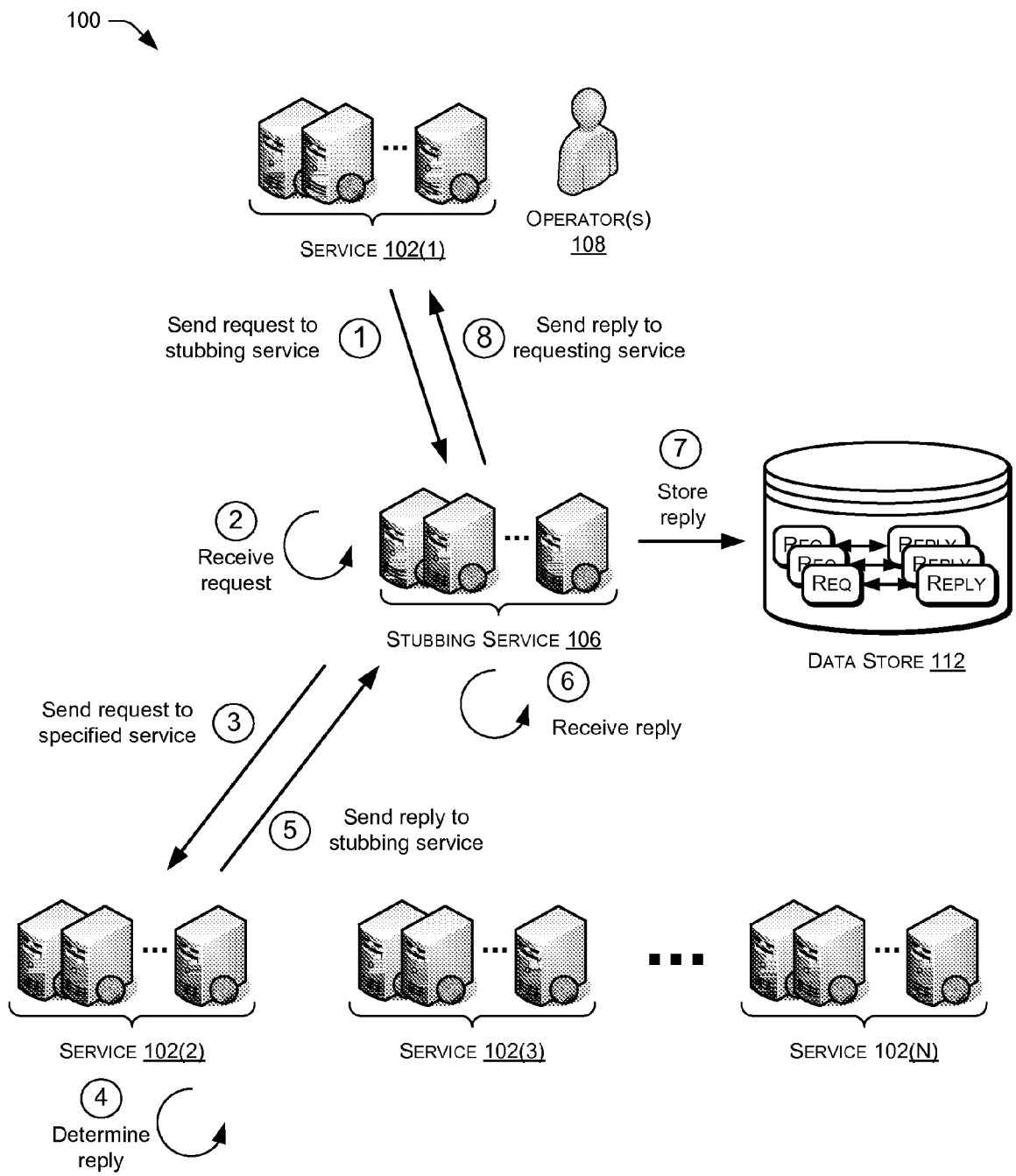
FIG. 2 is an example process that the environment of FIG. 1 may implement when the stubbing service is configured to operate in a "record mode."

FIG. 2 is an example process 200 that the environment of FIG. 1 may implement when the stubbing service 106 is configured to operate in a "record mode." This process (as well as other processes described throughout) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For discussion purposes, the process 200 (and the other processes) is described with reference to the architecture 100 of FIG. 1, although other architectures may implement this process.

In this example, at "1," the service 102(1) sends a request intended for a second service 102(2) to the stubbing service 106. This may be in response to the operator 108 invoking a test using a test framework, in response to the service 102(1) operating in normal production, or in response to any other trigger. From the perspective of the service 102(1), the request may appear bound for the service 102(2), although the stubbing service 106 may be configured to receive these and other requests within the environment 100.

At "2," the stubbing service 106 receives the request and, at "3," sends the request to the intended service 102(2). At "4," the service 102(2) determines the appropriate reply and then provides the reply to the stubbing service 106 at "5." At "6," the stubbing service 106 receives the reply and then, at "7," stores the reply in association with the original request in the data store 112. Finally, the stubbing service sends the reply to the requesting service 102(1) at "8." In some instances, the stubbing service sends the reply prior to storing the reply or performs the storing and sending of the reply in parallel.

At this point, the data store 112 now stores the reply associated with the original request, which may be used when the stubbing service 106 later receives this same request as discussed below with reference to FIG. 3.

In some instances, the stubbing service 106 stores the reply in association with the full request at "7." In other instances, however, the stubbing service 106 strips off one or more fields of the request when storing the reply with the request. For instance, if the request contains some dynamic data (e.g., a time of day, date, etc.), then stubbing service 106 may remove this data or otherwise remove it from consideration when attempting to match future requests with that request. By doing so, the stubbing service 106 ensures that future requests that match this request in each field other than the date or time of day will be determined to match.

Figure 3:
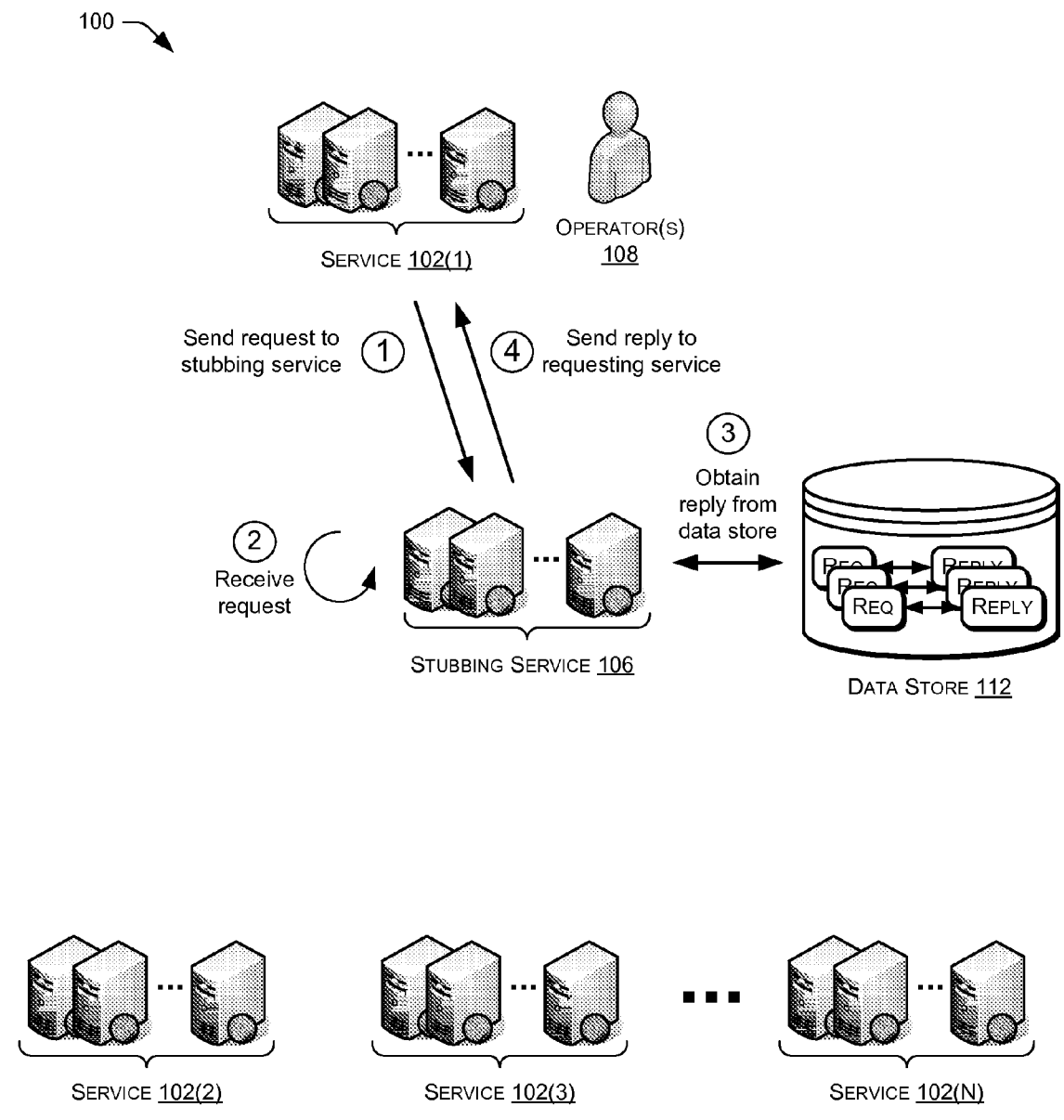
FIG. 3 is an example process that the environment of FIG. 1 may implement when the stubbing service is configured to operate in a "playback mode."

FIG. 3 is an example process 300 that the environment 100 of FIG. 1 may implement when the stubbing service 106 is configured to operate in a "playback mode." The operator 108 and/or another entity may have switched the stubbing service 106 from the record mode of FIG. 2 to this playback mode described with reference to FIG. 3.

This process 300 includes the service 102(1) sending the request intended for and addressed to the service 102(2) to the stubbing service 106 at "1." In this example, this request is the same request that the service sent to the stubbing service 106 in the process 200 described with reference to FIG. 2. In some instances, requests may be considered the same if each one requests a common item, even if these requests are sent at different times, if the requests also request different items, or if the requests vary slightly in other ways. That is the requests may be deemed to be the same if the determined similarity between the requests is greater than a preset threshold.

At "2," the stubbing service 106 receives the request and, due to its configuration of "playback mode," accesses the data store at "3" in an attempt to locate a corresponding reply. Here, the stubbing service 106 stored the reply in association with the same request during the process 200. As such, the stubbing service 106 is able to successfully locate and obtain the reply from the data store at "3." At "4," the stubbing service 106 sends a reply based at least in part on the stored reply to the service 102(1). In some instances, the stubbing service 106 sends the actual stored reply, while in other instances the stubbing service 106 or another entity modifies the stored reply in some way prior to sending a reply. For instance, the stubbing service 106 may add a current time of day to the reply or may otherwise modify the reply based on another piece of context (e.g., based on other requests sent in the batch of requests, etc.).

In instances where the stubbing service 106 previously stripped off one or more fields of the request (discussed above with reference to FIG. 2), the stubbing service may re-insert some dynamic data into the reply before providing the reply to the service 102(1). For instance, the stubbing service 106 may insert a current time of day or a current date to give the reply the appearance of having been generated in response to the request received at "1."

With use of the playback mode, a service under test (e.g., the service 102(1)) or any other service may leverage the stubbing service 106 in numerous ways. For instance, the service 102(1) may have previously instructed the stubbing service 106 to store requests and replies made when the service 102(1) was in production. Then, when the operator 108 wishes to update the service 102(1), the operator 108 can test the new, updated version of the feature against the previously stored production data by making the same requests, receiving the same replies, and comparing performance of the updated version of the service 102(1) against performance of the previous version of the service 102(1).

Because the operator 108 is using the same data that the previous version ran, the operator 108 is able to test the two different versions of the service 102(1) using an "apples-to-apples" comparison. As such, the operator 108 may fairly deduce that any changes in performance to the service 102(1) can be largely or wholly attributed to the changes to the service 102(1) rather than factors associated with the test data.

In addition, the operator 108 of the service 102(1) may simulate the performance of the service 102(1) in the event that the performances of other services vary (e.g., decline). For instance, the operator 108 may configure the stubbing service 106 to delay the sending of certain replies associated with certain ones of the services 102(2)-(N). By doing so, the operator may learn how adverse changes to other services within the distributed-services environment will affect the service 102(1) that the operator 108 maintains. The operator 108 may then work to mitigate the adverse performance affects of the service 102(1) in the event that other services display the poor performance in actuality.

In still another use case, services may use the replies stored by the stubbing service 106 in the data store to determine if updates to their respective services will affect these replies. For instance, envision that an operator of the service 102(2) makes an update to the service 102(2). The operator may then configure the stubbing service 106 to send a request to the service 102(2) that is the same as the request previously sent by the service 102(1) in the example of FIG. 2 above. Then, the service 102(2) can compare its new reply with the reply of FIG. 2 stored in the data store 112 to determine whether the reply has changed. In instances where the service 102(2) does not expect the reply to change, and yet it does, the service 102(2) may work to remedy this problem or may proactively inform the service 102(1) that the reply of service 102(2) will change in response to the service 102(1) sending the same request.

Figure 4:
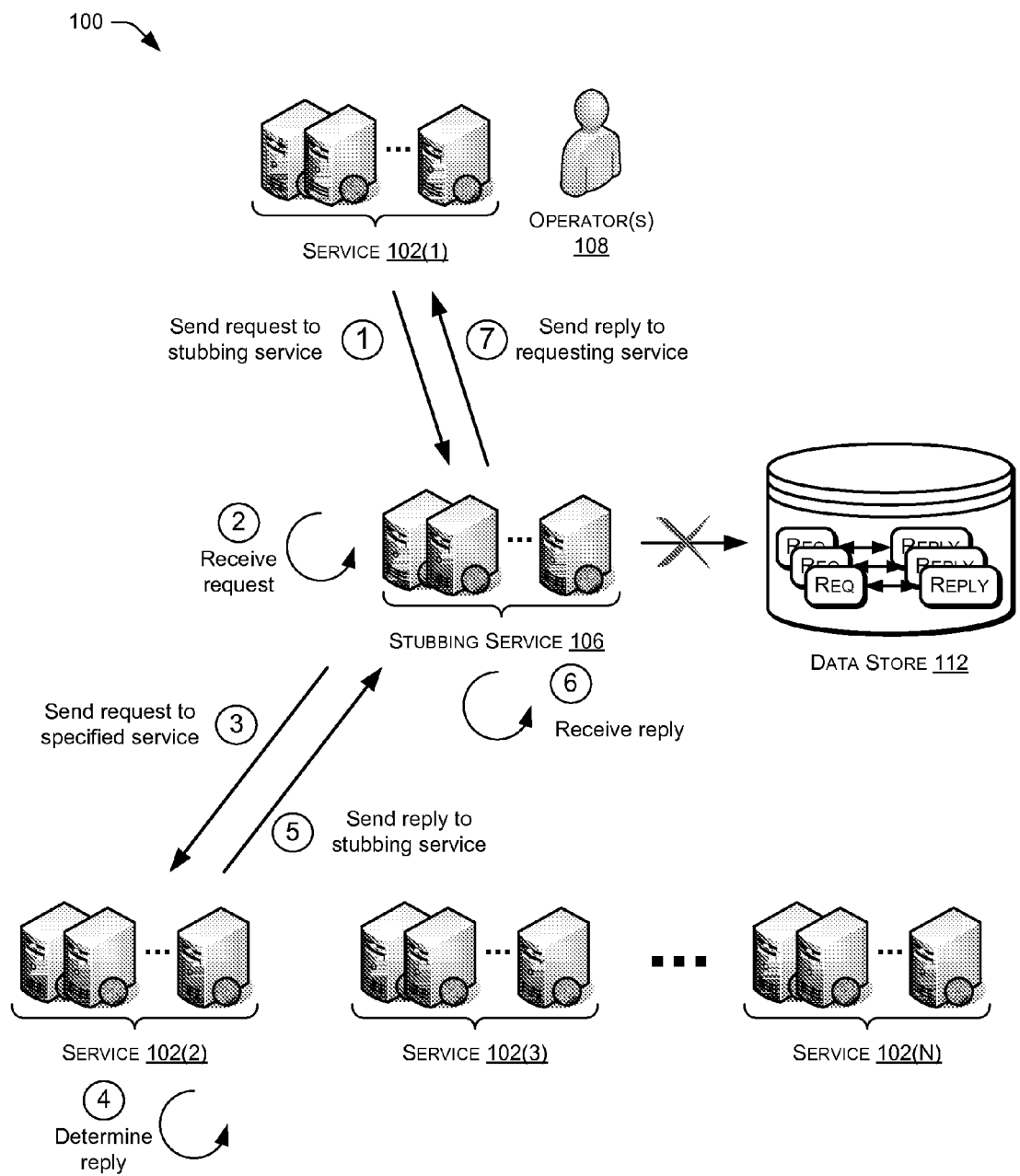
FIG. 4 is an example process that the environment of FIG. 1 may implement when the stubbing service is configured to operate in a "pass through mode."

FIG. 4 is an example process 400 that the environment 100 of FIG. 1 may implement when the stubbing service is configured to operate in a "pass through mode." Here, the stubbing service simply passes through requests and replies amongst a requesting service and a replying service.

In this example, the service 102(1) again sends a request intended for a second service 102(2) to the stubbing service 106 at "1." At "2," the stubbing service 106 receives the request and sends the request to the intended service 102(2) at "3." At "4," the service 102(2) determines the appropriate reply and then provides the reply to the stubbing service 106 at "5." At "6," the stubbing service 106 receives the reply. Finally, the stubbing service 106 sends the reply to the requesting service 102(1) at "7," without having stored or otherwise accessed the data store 112 (as indicated by the "X" in FIG. 4 between the stubbing service 106 and the data store 112).

Figure 5:
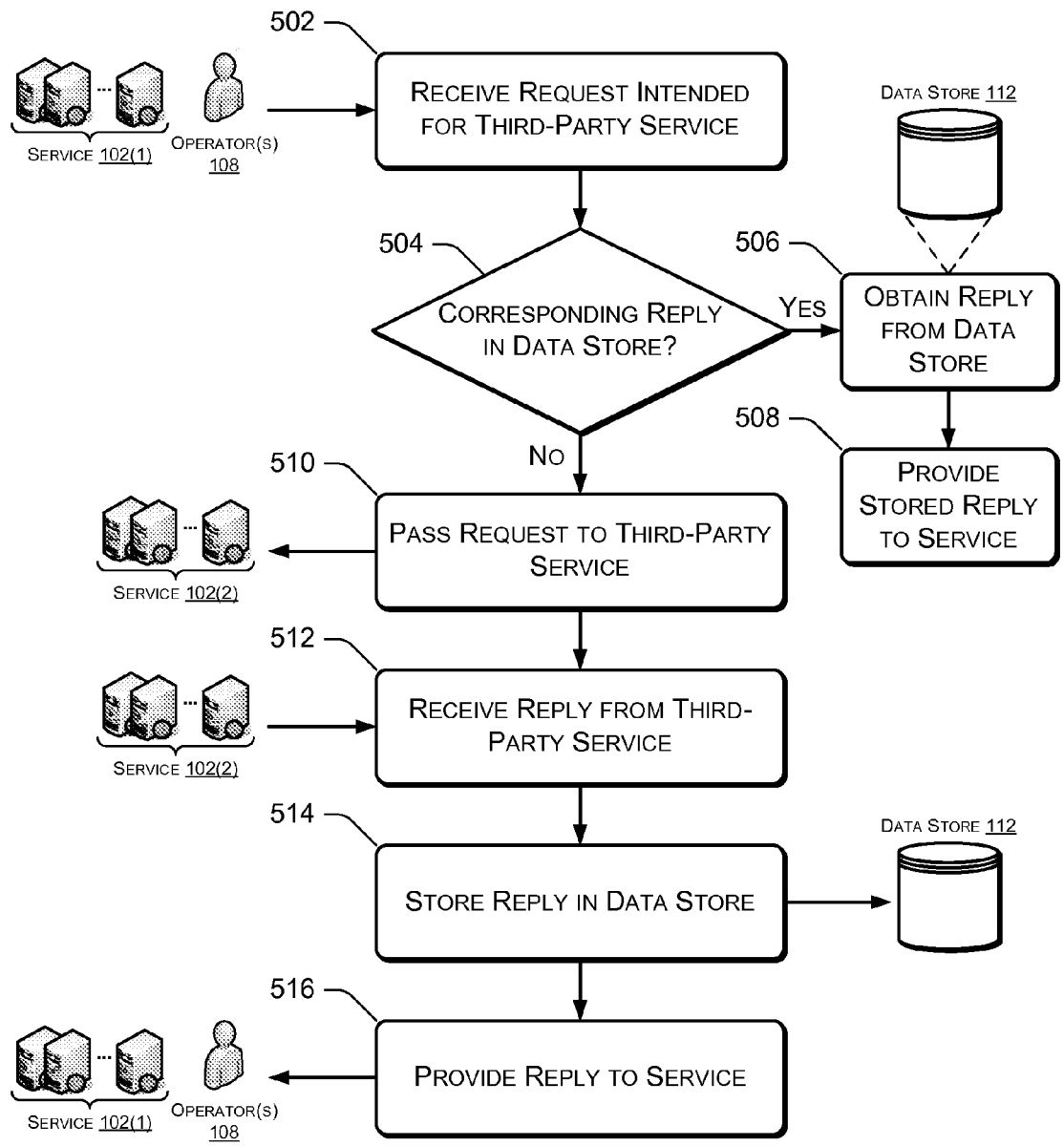
FIG. 5 is an example process that the environment of FIG. 1 may implement when the stubbing service is configured to operate in an "auto mode."

FIG. 5 is an example process 500 that the environment 100 of FIG. 1 may implement when the stubbing service 106 is configured to operate in an "auto mode." Here, the stubbing service 106 acts as if in "playback mode" when the stubbing service 106 has previously stored a particular reply associated with a request, and acts as if in "record mode" when the stubbing service 106 has not previously stored the particular reply associated with the request.

At 502, the stubbing service 106 receives a request intended for a third-party service. For instance, the stubbing service 106 may receive a request from the service 102(1) intended for the service 102(2). At 504, the stubbing service 106 queries as to whether a reply corresponding to the received request is stored in the data store 112. If so, then at 506 the stubbing service 106 obtains the reply from the data store and, at 508, the stubbing service 106 sends the stored and obtained reply to the requesting service.

If, however, the stubbing service 106 cannot locate the reply within the data store 112, then the stubbing service 106 passes the request along to the third-party service at 510. At 512, the stubbing service 106 receives a reply from the third-party service and, at 514, the stubbing service 106 stores this reply in association with the request in the data store 112. Finally, at 516, the stubbing service 106 provides the reply to the requesting service.

Figure 6:
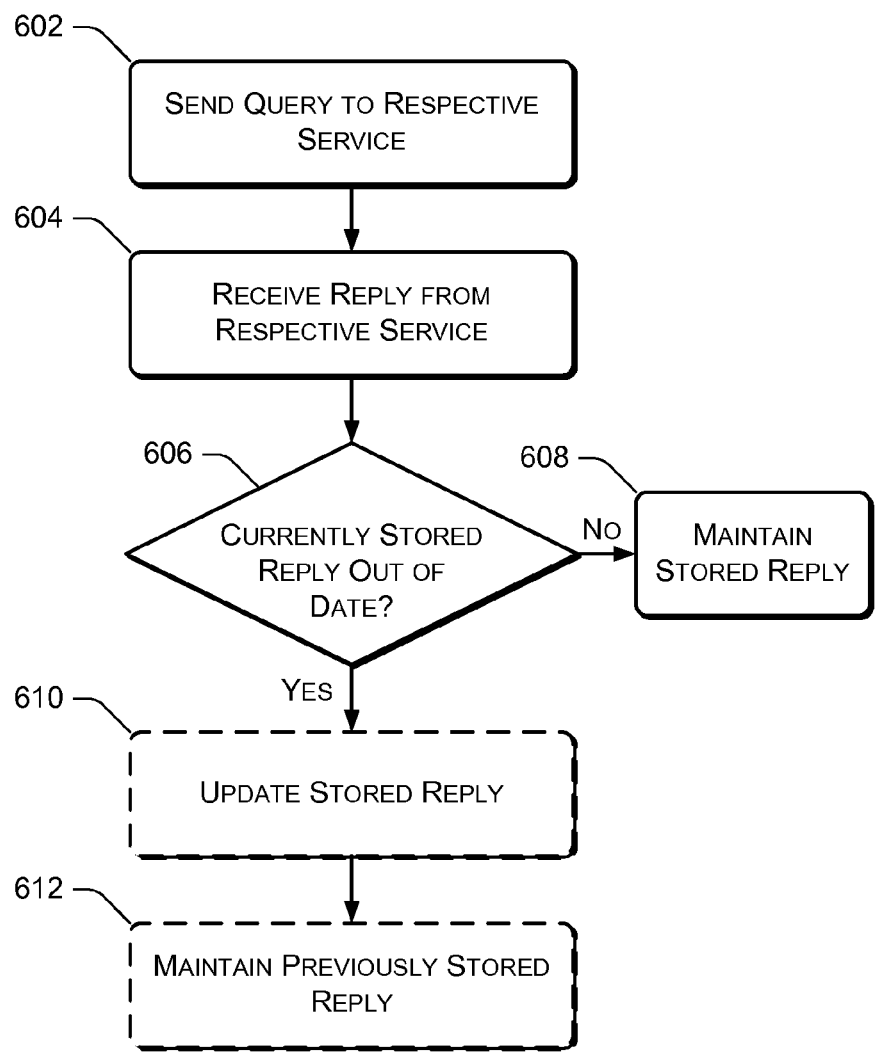
FIG. 6 is an example process that the environment of FIG. 1 may implement when the stubbing service is configured to operate in a "verification mode."

FIG. 6 is an example process 600 that the environment 100 of FIG. 1 may implement when the stubbing service 106 is configured to operate in a "verification mode." Here, the stubbing service 106 periodically or randomly sends a query to a service within the environment to determine whether or not one or more replies stored in the data store 112 are out of date.

The process 600 includes, at 602, the stubbing service 106 sending a query to a respective service that is associated with a reply. Returning to the example from FIG. 2, for instance, the stubbing service 106 may send a query to the service 102(2) that originally provided the reply stored in the data store 112. The stubbing service 106 may send this query periodically, randomly, or in response to any other triggering event. In each of these instances, the query may comprise the original request associated with the reply, the stored reply along with a request for the service to indicate whether the reply is out of date, or the like.

At 604, the stubbing service 106 receives a reply from the service and, at 606, the stubbing service 106 queries as to whether the received reply indicates that the stored reply is out of date. If the stubbing service 106 determines that the stored reply is not out of date, then the stubbing service 106 maintains the stored reply at 608. If, however, the stubbing service 106 determines that the stored reply is in fact out of date, then the stubbing service 106 may update the stored reply at 610.

At 612, the stubbing service 612 may or may not maintain the previously stored reply. In some instances, the stubbing service 106 may maintain the old, out-of-date reply (and potentially other out-of-date replies) for the purpose of allowing stable outputs for services under test. In certain implementations, the stubbing service may maintain replies from services according to different versions of the services so that operators can test their services against different versions of other services within the environment 100. For instance, the stubbing service 106 may maintain each reply of the service 102(2) for a first version of the service 102(2), and each reply of the service 102(2) for a second, updated version of the service 102(2).

As such, the service 102(1) may use the stubbing service 106 to test the service 102(1) against both versions of the service 102(2). When the service 102(1) sends a request intended for the service 102(2) via the stubbing service 106, the service 102(1) may indicate a version of the service 102(2) to use for the request. The stubbing service 106 may then use the appropriate stored reply from the data store (or may pass the request along to the service 102(2) if the specified version is a new, updated version of the service 102(2)).

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims

What is claimed is:

1. One or more non-transitory computer-readable media storing computer-executable instructions that, when executed, cause one or more processors of a stubbing service to perform acts comprising:
    accessing a request from a first service intended for a second service;
    causing the request to be passed to the second service at least partly in response to the receiving of the request;
    accessing a reply to the request from the second service;
    at least partly in response to the receiving of the reply:
        storing the reply in association with the request in a data store accessible by the stubbing service; and
        causing the reply to be sent to the first service;
    causing one or more queries to be sent to the second service over a period of time to determine if the reply to the request stored in the data store is up to date;
    again accessing the request intended for the second service from the first service; and
    at least partly in response to again receiving the request and at least partly in response to determining that the reply is up to date, causing a reply that is based at least in part on the reply previously stored in the data store to be sent to the first service.

2. One or more non-transitory computer-readable media as recited in claim 1, further storing computer-executable instructions that, when executed, cause the one or more processors of the stubbing service to perform an act comprising:
    switching the stubbing service from a first mode to a second mode after the passing of the request to the second service, wherein:
        the stubbing service passes requests to intended services, stores replies from the intended services in the data store, and sends the replies to requesting services when in the first mode; and
        the stubbing service sends replies stored in the data store to requesting services when in the second mode.

3. One or more non-transitory computer-readable media as recited in claim 1, further storing computer-executable instructions that, when executed, cause the one or more processors of the stubbing service to perform an act comprising refraining from passing the again received request to the second service.

4. One or more non-transitory computer-readable media as recited in claim 1, further storing computer-executable instructions that, when executed, cause the one or more processors of the stubbing service to perform acts comprising:
    updating the reply stored in the data store at least partly in response to determining that the reply is not up to date.

5. One or more non-transitory computer-readable media as recited in claim 1, wherein the first service and the second service each comprise one of multiple different services in a distributed-service environment, at least some of the multiple different services in the distributed-service environment communicating with one another over a network.

6. One or more non-transitory computer-readable media as recited in claim 5, wherein at least some of the multiple different services in the distributed-service environment are dependent upon one another but are separately controlled.

7. One or more non-transitory computer-readable media as recited in claim 1, wherein the first service sends the request intended for the second service in response to invoking a test of the first service.

8. One or more non-transitory computer-readable media as recited in claim 1, wherein the reply that is based at least in part on the reply previously stored is the reply previously stored.

9. A stubbing service comprising one or more processors and one or more non-transitory computer-readable media storing computer-executable instructions that, when executed, configure the one or more processors of the stubbing service to:
    operate in a first mode to:
        receive, from a first service in a distributed-services environment, a request addressed to a second service in the distributed-services environment;
        pass the request to the second service;
        receive a reply from the second service and store the reply in a data store; and
        provide the reply to the first service; and
    operate in a second mode to:
        again receive, from the first service, the request addressed to the second service;
        send a query to the second service to determine if the reply stored in the data store is current; and
        at least partly in response to a determination from the query that the reply is up to date, provide a reply that is based at least in part on the reply stored in the data store to the first service without passing the request to the second service.

10. A stubbing service as recited in claim 9, wherein the one or more non-transitory computer-readable media further store computer-executable instructions that, when executed, configure the one or more processors of the stubbing service to:
    operate in a third mode to:
        again receive, from the first service, the request addressed to the second service;
        determine if the data store stores the reply;
        at least partly in response to determining that the data store stores the reply, provide a reply that is based at least in part on the stored reply from the second service to the first service without passing the request to the second service; and at least partly in response to determining that the data store does not store the reply corresponding to the request:
pass the request to the second service;
receive the reply from the second service and store the reply; and
provide the reply to the first service.

11. A stubbing service as recited in claim 9, wherein the one or more non-transitory computer-readable media further store computer-executable instructions that, when executed, configure the one or more processors of the stubbing service to:
operate in a third mode to pass each request received from a service of the distributed-services environment to a service to which the respective request is addressed regardless of whether the data store stores a corresponding reply to the request.

12. A stubbing service as recited in claim 9, wherein the one or more non-transitory computer-readable media further store computer-executable instructions that, when executed, configure the one or more processors of the stubbing service to:
update the reply stored in the data store at least partly in response to determining that the reply stored in the data store is not current.

13. A stubbing service as recited in claim 9, wherein the stubbing service is configurable to operate in the first mode for the first service while operating in the second mode for a different service in the distributed-services environment.

14. A stubbing service as recited in claim 9, wherein the stubbing service is configurable by a requesting service to (1) provide a stored reply to a request without contacting a corresponding service associated with the reply given a first set of conditions, and (2) contact the corresponding service to receive the reply and provide the reply received from the corresponding service given a second, different set of conditions.

15. A method comprising:
under control of one or more computer systems configured with specific executable instructions,
sending, from a first service within a distributed-services environment and to a stubbing service, a request intended for a second service of the distributed-services environment;
receiving a reply to the request at the first service and from the stubbing service, the stubbing service having received the request, passed the request along to the second service, received the reply from the second service, and stored the received reply;
after the receiving of the reply at the first service, re-sending the request from the first service to the stubbing service; and
receiving a reply that is based at least in part on the stored reply from the stubbing service, the stubbing service having received the request, refrained from passing the request onto the second service, and modified the stored reply to generate the reply.

16. A method as recited in claim 15, further comprising:
configuring the stubbing service to send the stored reply in response to receiving the re-sent request.

17. A method as recited in claim 16, wherein the configuring of the stubbing service occurs after an initial request by the first service.

18. A method as recited in claim 15, further comprising:
sending, from the first service and to the stubbing service, a request intended for a third service in the distributed-services environment; and
receiving a reply to the request from the stubbing service, the stubbing service having received the reply from the third service in response to first service sending the request or in response to a previously sent request.

19. A method as recited in claim 15, further comprising:
configuring the stubbing service to (1) provide a stored reply to a request without contacting a corresponding service associated with the reply given a first set of conditions, and (2) contact the corresponding service to receive the reply and provide the reply received from the corresponding service given a second, different set of conditions.

20. A method as recited in claim 15, further comprising:
configuring the stubbing service to (1) provide a stored reply to a request in response to receiving the request from the first service, and (2) delay the providing of the stored reply.

21. A method as recited in claim 15, further comprising:
providing, by the first service and to the stubbing service, a reply for storing in association with a particular request;
sending the particular request from the first service and to the stubbing service; and
receiving, at the first service and from the stubbing service, the reply stored in association with the particular request at least partly in response to the sending of the request.

22. A method comprising:
under control of one or more computer systems configured with specific executable instructions,
receiving, from a first service and at a stubbing service, a request intended for a second service;
determining if a data store accessible by the stubbing service stores a reply corresponding to the request, the reply being in response to a previous request provided by the first service;
at least partly in response to response to determining that the data store stores the reply, determining that there is an updated reply associated with the stored reply;
maintaining the stored reply for subsequent use and providing the updated reply to the first service without passing the request to the second service; and
at least partly in response to response to determining that the data store does not store the reply corresponding to the request:
passing the request to the second service;
receiving the reply from the second service and storing the reply in the data store; and
providing the reply to the first service.

23. A method as recited in claim 22, wherein the first and second services each comprise one of multiple different services in a distributed-service environment, at least some of the multiple different services in the distributed-service environment communicating with one another over a network.

24. A method as recited in claim 23, wherein at least some of the multiple different services in the distributed-service environment are dependent upon one another but are separately controlled.

* * * * *